UNITED STATES PATENT OFFICE.

HERMANN PROTZE, OF ELBERFELD, PRUSSIA, GERMANY.

PRESERVING VACCINE.

SPECIFICATION forming part of Letters Patent No. 273,390, dated March 6, 1883.

Application filed December 20, 1882. (No specimens.)

*To all whom it may concern:*

Be it known that I, HERMANN PROTZE, a subject of the Kingdom of Prussia, and a resident of the city of Elberfeld, in the Kingdom of Prussia, German Empire, have invented certain new and useful Improvements in Preserving Vaccine, of which the following is a specification.

The manner of obtaining animal vaccine from calves or young cows is well known.

This invention has reference to an improved method of treating and preserving vaccine by mixing it with glycerine and thymol.

To one part of freshly-obtained vaccine is added one part of pure glycerine and one part of an aqueous solution of thymol, which parts are carefully mixed together. The solution of thymol is obtained by dissolving seventy-five one-thousandths part of thymol in one hundred parts of distilled water, (thymoli 0.075, aquæ distillate 100.0.)

The mixture thus obtained is kept in a cool dark place, and after three hours it is filled into capillary tubes, which are immediately sealed by the spirit-flame.

Vaccine so preserved can be used three months after its preparation, while ordinary vaccine without any addition spoils in a few days.

In place of thymol, any other equivalent substance having the same preservative properties may be employed.

I am aware that a solution of thymol, alcohol, water, and glycerine has been used in dressing wounds; but this differs from my invention both in substance and purpose.

Having thus described my invention, I claim as new and desire to secure by Letters Patent—

As a new product, the compound herein described, consisting of vaccine, thymol, glycerine, and water, as and for the purpose set forth.

In testimony whereof I have signed my name to this specification in the presence of two subscribing witnesses.

HERMANN PROTZE.

Witnesses:
CARL FRAWEIN,
KARL VON DER HEYDT.